(12) United States Patent
Tsuchiya

(10) Patent No.: US 7,355,751 B2
(45) Date of Patent: Apr. 8, 2008

(54) METHOD AND APPARATUS FOR CREATING COLOR CONVERSION TABLE

(75) Inventor: Okinori Tsuchiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 10/464,529

(22) Filed: Jun. 19, 2003

(65) Prior Publication Data
US 2003/0234947 A1 Dec. 25, 2003

(30) Foreign Application Priority Data
Jun. 20, 2002 (JP) .............................. 2002-180057

(51) Int. Cl.
*H04N 1/60* (2006.01)
*G06K 9/00* (2006.01)

(52) U.S. Cl. ..................... 358/1.9; 358/523; 358/504; 382/162; 382/167

(58) Field of Classification Search ................ 358/1.9, 358/500–504, 509, 518–520, 523, 515, 525; 382/162, 166–167, 274; 345/589–604; 347/43, 347/115, 117, 232; 348/645–663
See application file for complete search history.

(56) References Cited

U.S. PATENT DOCUMENTS

| | | | |
|---|---|---|---|
| 5,341,464 A * | 8/1994 | Friedman et al. ........... | 345/590 |
| 5,592,591 A * | 1/1997 | Rolleston ..................... | 358/1.5 |
| 5,600,764 A | 2/1997 | Kakutani ..................... | 395/131 |
| 6,151,135 A * | 11/2000 | Tanaka et al. ............... | 358/1.9 |
| 6,229,915 B1 * | 5/2001 | Ohkubo ....................... | 382/167 |
| 7,127,102 B2 * | 10/2006 | Hiramatsu et al. .......... | 382/162 |
| 2003/0025759 A1 | 2/2003 | Nagoshi et al. ............... | 347/43 |
| 2003/0081831 A1 | 5/2003 | Fukao et al. ................ | 382/167 |
| 2005/0128495 A1* | 6/2005 | Arai ............................ | 358/1.9 |

FOREIGN PATENT DOCUMENTS

| | | |
|---|---|---|
| JP | 07-030772 | 1/1995 |
| JP | 10-173951 | 6/1998 |

* cited by examiner

*Primary Examiner*—Twyler Lamb
*Assistant Examiner*—Charlotte M. Baker
(74) *Attorney, Agent, or Firm*—Fitzpatrick, Cella, Harper & Scinto

(57) ABSTRACT

If the grids of a color conversion table are simply downsampled, the way ink is used (the manner of the changeover in the value of a CMYKlclm signal) differs from that color conversion table before downsampling, there is a shift in the starting point of dark ink at the point of changeover of continuous tone ink, and a decline in image quality ascribable to downsampling of the color conversion table tends to occur. Accordingly, an original LUT is read in, a parameter for selecting a grid to be downsampled is set, a table of evaluation values for selecting a grid to be downsampled is created, a grid capable of being downsampled is selected by referring to the evaluation-value table, and table data that does not contain this grid is copied.

8 Claims, 16 Drawing Sheets

FIG. 4

| R | G | B | C | M | Y | K | lc | lm |
|---|---|---|---|---|---|---|---|---|
| 0 | 0 | 0 | 0 | 8 | 16 | 24 | 32 | 40 |
| 0 | 0 | 8 | 108 | 104 | 84 | 255 | 0 | 0 |
| 0 | 0 | 16 | 139 | 141 | 80 | 240 | 0 | 0 |
| 0 | 0 | 24 | 170 | 178 | 76 | 225 | 0 | 0 |
| 0 | 0 | 32 | 185 | 193 | 73 | 193 | 0 | 0 |
| 0 | 0 | 40 | 200 | 208 | 69 | 160 | 0 | 0 |
| 0 | 0 | 48 | 210 | 217 | 66 | 130 | 0 | 0 |
| 0 | 0 | 56 | 220 | 226 | 62 | 100 | 0 | 0 |
| 0 | 0 | 64 | 225 | 231 | 59 | 70 | 0 | 0 |
| 0 | 0 | 72 | 230 | 235 | 56 | 40 | 0 | 0 |
| 0 | 0 | 80 | 233 | 239 | 53 | 28 | 0 | 0 |
| 0 | 0 | 88 | 236 | 242 | 50 | 15 | 0 | 0 |
| 0 | 0 | 96 | 238 | 243 | 48 | 8 | 0 | 0 |
| 0 | 0 | 104 | 240 | 244 | 46 | 0 | 0 | 0 |
| 0 | 0 | 112 | 241 | 245 | 44 | 0 | 0 | 0 |
| 0 | 0 | 120 | 242 | 246 | 41 | 0 | 0 | 0 |
| 0 | 0 | 128 | 243 | 247 | 38 | 0 | 0 | 0 |
| 0 | 0 | 136 | 244 | 247 | 35 | 0 | 0 | 0 |
| 0 | 0 | 144 | 245 | 248 | 33 | 0 | 0 | 0 |
| 0 | 0 | 152 | 246 | 248 | 30 | 0 | 0 | 0 |
| 0 | 0 | 160 | 246 | 249 | 28 | 0 | 0 | 0 |
| 0 | 0 | 168 | 246 | 249 | 25 | 0 | 0 | 0 |
| 0 | 0 | 176 | 246 | 249 | 23 | 0 | 0 | 0 |
| 0 | 0 | 184 | 246 | 249 | 21 | 0 | 0 | 0 |
| 0 | 0 | 192 | 246 | 249 | 19 | 0 | 0 | 0 |
| 0 | 0 | 200 | 246 | 249 | 16 | 0 | 0 | 0 |
| 0 | 0 | 208 | 246 | 249 | 14 | 0 | 0 | 0 |
| 0 | 0 | 216 | 246 | 249 | 11 | 0 | 0 | 0 |
| 0 | 0 | 224 | 246 | 249 | 9 | 0 | 0 | 0 |
| 0 | 0 | 232 | 246 | 249 | 7 | 0 | 0 | 0 |
| 0 | 0 | 240 | 246 | 249 | 5 | 0 | 5 | 5 |
| 0 | 0 | 248 | 246 | 249 | 3 | 0 | 10 | 10 |
| 0 | 0 | 255 | 246 | 249 | 2 | 0 | 20 | 20 |
| 0 | 8 | 0 | 246 | 249 | 0 | 0 | 30 | 30 |
| 0 | 8 | 8 | 139 | 116 | 113 | 243 | 0 | 4 |
| 0 | 8 | 16 | 143 | 143 | 107 | 229 | 0 | 9 |
| ⋮ | ⋮ | ⋮ | ⋮ | ⋮ | ⋮ | ⋮ | ⋮ | ⋮ |
| 255 | 255 | 255 | 0 | 0 | 0 | 0 | 0 | 0 |

FIG. 8

| | GRID-POINT NUMBER | | | LUT OUTPUT VALUE OF SOURCE OF CONVERSION | | | | | | LUT AMOUNT OF CHANGE | | | | | |
|---|---|---|---|---|---|---|---|---|---|---|---|---|---|---|---|
| | R | G | B | C | M | Y | K | lc | lm | C | M | Y | K | lc | lm |
| GRAY W | 32 | 32 | 32 | 0 | 0 | 0 | 0 | 0 | 0 | 0 | 0 | 2 | 0 | 6 | 6 |
| | 31 | 31 | 31 | 0 | 0 | 0 | 0 | 6 | 6 | 0 | 0 | 0 | 0 | 0 | 0 |
| | 30 | 30 | 30 | 0 | 0 | 0 | 0 | 12 | 12 | 0 | 0 | 0 | 0 | 1.5 | 1.5 |
| | ... | ... | ... | ... | ... | ... | ... | ... | ... | ... | ... | ... | ... | ... | ... |
| | 3 | 3 | 3 | 133 | 140 | 107 | 119 | 77 | 83 | 3 | 45 | 1 | 5 | 1 | 2.5 |
| | 2 | 2 | 2 | 130 | 137 | 102 | 166 | 55 | 61 | 1 | 45 | 1.5 | 1 | 2.5 | 5 |
| | 1 | 1 | 1 | 125 | 125 | 94 | 211 | 28 | 29 | 6 | 45 | 1 | 0 | 0 | 1.5 |
| K | 0 | 0 | 0 | 108 | 104 | 84 | 255 | 0 | 0 | 455 | 41.5 | 37 | 149.5 | 14 | 14.5 |
| W2Y W | 32 | 32 | 32 | 0 | 0 | 0 | 0 | 0 | 0 | 54 | 52 | 42 | 127.5 | 1.5 | 0 |
| | 31 | 32 | 32 | 0 | 0 | 0 | 0 | 3 | 0 | 0 | 0 | 0 | 0 | 0 | 0 |
| | 30 | 32 | 32 | 0 | 0 | 0 | 0 | 7 | 0 | 0 | 0 | 0 | 0 | 0 | 0 |
| | ... | ... | ... | ... | ... | ... | ... | ... | ... | ... | ... | ... | ... | ... | ... |
| | 3 | 32 | 32 | 165 | 0 | 0 | 0 | 219 | 0 | 0 | 0 | 0 | 0 | 2 | 0 |
| | 2 | 32 | 32 | 197 | 0 | 0 | 0 | 200 | 0 | 2 | 0 | 0 | 0 | 2 | 0 |
| | 1 | 32 | 32 | 225 | 0 | 0 | 0 | 177 | 0 | 2 | 0 | 0 | 0 | 3 | 0 |
| Y | 0 | 32 | 32 | 249 | 0 | 0 | 0 | 160 | 0 | 12 | 0 | 0 | 0 | 8.5 | 0 |
| C2K C | 0 | 32 | 32 | 249 | 0 | 0 | 0 | 160 | 0 | 0 | 0 | 1 | 0 | 7.5 | 4.5 |
| | 0 | 31 | 31 | 249 | 0 | 2 | 0 | 145 | 9 | 0 | 0 | 0 | 0 | 0 | 0 |
| | 0 | 30 | 30 | 249 | 0 | 4 | 0 | 130 | 18 | 0 | 0 | 1 | 0 | 0 | 1 |
| | ... | ... | ... | ... | ... | ... | ... | ... | ... | ... | ... | ... | ... | ... | ... |
| | 0 | 3 | 3 | 196 | 186 | 138 | 157 | 0 | 32 | 25 | 5 | 2.5 | 0 | 0 | 0 |
| | 0 | 2 | 2 | 175 | 174 | 126 | 199 | 0 | 18 | 55 | 9.5 | 3.5 | 6 | 0 | 2.5 |
| | 0 | 1 | 1 | 143 | 143 | 107 | 229 | 0 | 9 | 15 | 4 | 2 | 2 | 0 | 0 |
| K | 0 | 0 | 0 | 108 | 104 | 84 | 255 | 0 | 0 | 365 | 325 | 305 | 140.5 | 0 | 4.5 |

FIG. 9

| | GRID-POINT NUMBER | | | LUT OUTPUT VALUE OF SOURCE OF CONVERSION | | | | | | TABLE OF IRREMOVABLE GRID POINTS | | | | | | |
|---|---|---|---|---|---|---|---|---|---|---|---|---|---|---|---|---|
| | R | G | B | C | M | Y | K | lc | lm | C | M | Y | K | lc | lm | * |
| GRAY W | 32 | 32 | 32 | 0 | 0 | 0 | 0 | 0 | 0 | 0 | 0 | 0 | 0 | 0 | 0 | 0 |
| | 31 | 31 | 31 | 0 | 0 | 2 | 0 | 6 | 6 | 1 | 1 | 1 | 1 | 1 | 1 | 0 |
| | 30 | 30 | 30 | 0 | 0 | 3 | 0 | 12 | 12 | 1 | 1 | 1 | 1 | 1 | 1 | 1 |
| | ... | ... | ... | ... | ... | ... | ... | ... | ... | ... | ... | ... | ... | ... | ... | ... |
| | 3 | 3 | 3 | 133 | 140 | 107 | 119 | 77 | 83 | 1 | 1 | 1 | 1 | 1 | 1 | 1 |
| | 2 | 2 | 2 | 130 | 137 | 102 | 166 | 55 | 61 | 1 | 1 | 1 | 1 | 1 | 1 | 1 |
| | 1 | 1 | 1 | 125 | 125 | 94 | 211 | 28 | 29 | 1 | 1 | 1 | 1 | 1 | 1 | 1 |
| K | 0 | 0 | 0 | 108 | 104 | 84 | 255 | 0 | 0 | 0 | 0 | 0 | 0 | 0 | 0 | 0 |
| W2Y W | 32 | 32 | 32 | 0 | 0 | 0 | 0 | 0 | 0 | 0 | 0 | 0 | 0 | 0 | 0 | 0 |
| | 31 | 32 | 32 | 0 | 0 | 0 | 0 | 3 | 0 | 1 | 1 | 1 | 1 | 1 | 1 | 1 |
| | 30 | 32 | 32 | 0 | 0 | 0 | 0 | 7 | 0 | 1 | 1 | 1 | 1 | 1 | 1 | 1 |
| | ... | ... | ... | ... | ... | ... | ... | ... | ... | ... | ... | ... | ... | ... | ... | ... |
| | 3 | 32 | 32 | 165 | 0 | 0 | 0 | 219 | 0 | 1 | 1 | 1 | 1 | 1 | 1 | 1 |
| | 2 | 32 | 32 | 197 | 0 | 0 | 0 | 200 | 0 | 1 | 1 | 1 | 1 | 1 | 1 | 1 |
| | 1 | 32 | 32 | 225 | 0 | 0 | 0 | 177 | 0 | 1 | 1 | 1 | 1 | 1 | 1 | 1 |
| Y | 0 | 32 | 32 | 249 | 0 | 0 | 0 | 160 | 0 | 0 | 0 | 0 | 0 | 0 | 0 | 0 |
| C2K C | 0 | 32 | 32 | 249 | 0 | 0 | 0 | 160 | 0 | 0 | 1 | 1 | 1 | 1 | 1 | 0 |
| | 0 | 31 | 31 | 249 | 0 | 2 | 157 | 145 | 9 | 1 | 1 | 1 | 1 | 1 | 1 | 1 |
| | 0 | 30 | 30 | 249 | 0 | 4 | 199 | 130 | 18 | 1 | 1 | 1 | 1 | 1 | 1 | 1 |
| | ... | ... | ... | ... | ... | ... | ... | ... | ... | ... | ... | ... | ... | ... | ... | ... |
| | 0 | 3 | 3 | 196 | 186 | 138 | 157 | 0 | 32 | 1 | 1 | 1 | 1 | 1 | 1 | 1 |
| | 0 | 2 | 2 | 175 | 174 | 126 | 199 | 0 | 18 | 1 | 1 | 1 | 1 | 1 | 1 | 1 |
| | 0 | 1 | 1 | 143 | 143 | 107 | 229 | 0 | 9 | 1 | 1 | 1 | 1 | 1 | 1 | 1 |
| K | 0 | 0 | 0 | 108 | 104 | 84 | 255 | 0 | 0 | 0 | 0 | 0 | 0 | 0 | 0 | 0 |

*  DATA OF IRREMOVABLE GRID POINTS

FIG. 11

| R | G | B | C | M | Y | K | lc | lm |
|---|---|---|---|---|---|---|---|---|
| 0 | 0 | 0 | 0 | 8 | 16 | 24 | 32 | 40 |
| 0 | 0 | 8 | 108 | 104 | 84 | 255 | 0 | 0 |
| 0 | 0 | 16 | 139 | 141 | 80 | 240 | 0 | 0 |
| 0 | 0 | 32 | 185 | 193 | 73 | 193 | 0 | 0 |
| 0 | 0 | 48 | 210 | 217 | 66 | 130 | 0 | 0 |
| 0 | 0 | 64 | 225 | 231 | 59 | 70 | 0 | 0 |
| 0 | 0 | 72 | 230 | 235 | 56 | 40 | 0 | 0 |
| 0 | 0 | 80 | 233 | 239 | 53 | 28 | 0 | 0 |
| 0 | 0 | 88 | 236 | 242 | 50 | 15 | 0 | 0 |
| 0 | 0 | 104 | 240 | 244 | 46 | 0 | 0 | 0 |
| 0 | 0 | 112 | 241 | 245 | 44 | 0 | 0 | 0 |
| 0 | 0 | 120 | 242 | 246 | 41 | 0 | 0 | 0 |
| 0 | 0 | 136 | 244 | 247 | 35 | 0 | 0 | 0 |
| 0 | 0 | 152 | 245 | 248 | 30 | 0 | 0 | 0 |
| 0 | 0 | 168 | 246 | 249 | 25 | 0 | 0 | 0 |
| 0 | 0 | 200 | 246 | 249 | 16 | 0 | 0 | 0 |
| 0 | 0 | 232 | 246 | 249 | 7 | 0 | 0 | 0 |
| 0 | 0 | 248 | 246 | 249 | 3 | 0 | 10 | 10 |
| 0 | 0 | 255 | 246 | 249 | 2 | 0 | 20 | 20 |
| 0 | 8 | 0 | 246 | 249 | 0 | 0 | 30 | 30 |
| 0 | 8 | 8 | 139 | 116 | 113 | 243 | 0 | 4 |
| 0 | 8 | 16 | 143 | 143 | 107 | 229 | 0 | 9 |
| ⋮ | ⋮ | ⋮ | ⋮ | ⋮ | ⋮ | ⋮ | ⋮ | ⋮ |
| 255 | 255 | 255 | 0 | 0 | 0 | 0 | 0 | 0 |

METHOD AND APPARATUS FOR CREATING COLOR CONVERSION TABLE

FIELD OF THE INVENTION

This invention relates to a method and apparatus for creating a color conversion table. More particularly, the invention relates to color conversion processing for transforming continuous tone color-specification data between spaces having different color specifications.

BACKGROUND OF THE INVENTION

A color printing system for printing a color image in association with a computer is known as a technique that utilizes a color conversion table for transforming continuous tone color-specification data between different color-specification spaces.

The color image in a computer expresses tone by the three primary colors of red (R), green (G) and blue (B) for every pixel of pixels arrayed in horizontal and vertical directions. A color printer, on the other hand, prints in four colors, namely cyan (C), magenta (M), yellow (Y) and black (K), or in six colors, namely the above-mentioned four colors and, in addition, light cyan (lc) and light magenta (lm). In order to print in color, therefore, two operations are necessary, namely an operation in which representation based upon the three primary colors RGB is converted to representation by, e.g., CMYKlclm, and an operation in which continuous tone representation of each pixel is excluded as necessary. It should be noted that although continuous tone representation of each pixel is excluded in the latter operation, continuous tone representation of an image by error diffusion or dithering is maintained.

Though color space per se is a single space, display differs depending upon how the coordinates are taken and therefore, for the sake of convenience, such space shall be referred to below as a color-specification space that conforms to the manner in which the coordinates taken.

A conversion from RGB representation to CMYKlclm representation is not uniquely defined by conversion equations. The usual practice is to obtain the mutual corresponding relationship between the color spaces in which the respective continuous levels are adopted as the coordinates and effect the conversion sequentially utilizing the corresponding relationship. Therefore, if each of the colors RGB to undergo conversion is represented by 256 levels, then a color conversion table of about 16,700,000 (256×256×256) elements will be required. In actuality, taking efficient utilization of memory resources into consideration, a corresponding relationship regarding all coordinate values is not prepared. Rather, it suffices to prepare a corresponding relationship between sporadically set grid points as a color conversion table and obtain a corresponding relationship utilizing an interpolation operation for points located between grid points. In other words, a corresponding relationship between a color of certain coordinates in RGB color-specification space and CMYKlclm color-specification space can be obtained by, e.g., linearly interpolating the corresponding relationship between grid points that surround the above coordinates.

Such a color conversion table generally is provided in a printer driver. The number of grid points of the color conversion table included in a printer driver is decided in conformity with the individual color printer.

However, the format of the above-described color conversion table is such that table size increases rapidly if use is made of a highly accurate color conversion table, namely a color conversion table having a large number of grid points. For this reason, when it is attempted to perform a highly accurate color conversion as by a photo-direct printer that prints an image that has been recorded in an external memory such as compact flash ® (CF) card, problems arise because of hardware having a comparatively small storage capacity if use is made of a printer driver that includes a highly accuracy color conversion table.

In an effort to solve this problem, the specification of, e.g., Japanese Patent Application Laid-Open No. 10-173951 discloses a method of creating a color conversion table of small size from a full-size (256×256×256 bytes in a case where each of the colors R, G, B is composed of eight bits) color conversion table by downsampling processing. Of course, this can also be achieved by simply downsampling (e.g., eliminating every other grid) the full-size color conversion table as by averaging.

The method of creating the color conversion table described in the specification of Japanese Patent Application Laid-Open No. 10-173951 above makes it possible to create a color conversion table of small size by downsampling a full-size color conversion table. However, a color conversion table of even smaller size cannot be created by downsampling an already created color conversion table having a size smaller than the full size.

Further, if the above-described simple downsampling method is used in the downsampling of a color conversion table, the way in which the ink of the gray line is used (the way in which CMYKlclm signal values are changed over) differs from that of the color conversion table prior to downsampling. More specifically, with regard to the gray line of a color conversion table having 17 grids shown in FIG. 13, which has been obtained by simple downsampling of a color conversion table having 33 grids of the kind shown in FIG. 12, the method of use of ink at the portion where the continuous tone ink changes over (indicated by the arrows in FIG. 13) is obviously different from that of the color conversion table prior to the conversion. At the portion where the continuous tone ink changes over, the point at which the dark ink starts appearing shifts and a decline in image quality, which is ascribable to downsampling of the color conversion table, tends to occur. Here a case in which the above-mentioned simple interpolation method is used in a 6-color color conversion table for RGB→CMYKlclm has been described. However, there are instances where a similar decline in image quality occurs when simple interpolation is applied by the same method to a 4-color or 3-color color conversion table for RGB→CMYK or RGB→CMY, or to a 3-color color correction table for RGB→R'G'B'.

SUMMARY OF THE INVENTION

Accordingly, an object of the present invention is to solve the above-mentioned problems individually or collectively and create a color conversion table from a color conversion table of any number of grids by downsampling grids while limiting effect upon image quality.

According to the present invention, the foregoing object is attained by providing a method of generating a color conversion table for transforming continuous tone color-specification data between different color-specification spaces, comprising the steps of:

inputting a color conversion table to serve as a source of conversion to a color conversion table after conversion;

setting a limitation when transforming the color conversion table to serve as the source of conversion;

examining a conversion characteristic of the color conversion table to serve as the source of conversion; and generating the color conversion table after conversion by downsampling data, which corresponds to a grid of the color conversion table to serve as the source of conversion, based upon result of the examination of conversion characteristic and the limitation.

Further, according to the present invention, the foregoing object is attained by providing an apparatus for generating a color conversion table for transforming continuous tone color-specification data between different color-specification spaces, comprising:

an input section arranged to input a color conversion table to serve as a source of conversion to a color conversion table after conversion;

a setting section arranged to set a limitation when transforming the color conversion table to serve as the source of conversion;

an examination section arranged to examine a conversion characteristic of the color conversion table to serve as the source of conversion; and a generator arranged to generate the color conversion table after conversion by downsampling data, which corresponds to a grid of the color conversion table to serve as the source of conversion, based upon result of the examination of conversion characteristic and the limitation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing an example of an original LUT;

FIG. 8 is a diagram showing an example of a table illustrating amount of change in a LUT;

FIG. 9 is a diagram showing an example of a table of irremovable grid points;

FIG. 11 is a diagram illustrating an example of a color conversion table after downsampling processing;

DETAILED DESCRIPTION OF THE PREFERRED EMBODIMENTS

An image processing apparatus according to an embodiment of the present invention will be described in detail with reference to the drawings.

First Embodiment

[Structure]

Figure 1:
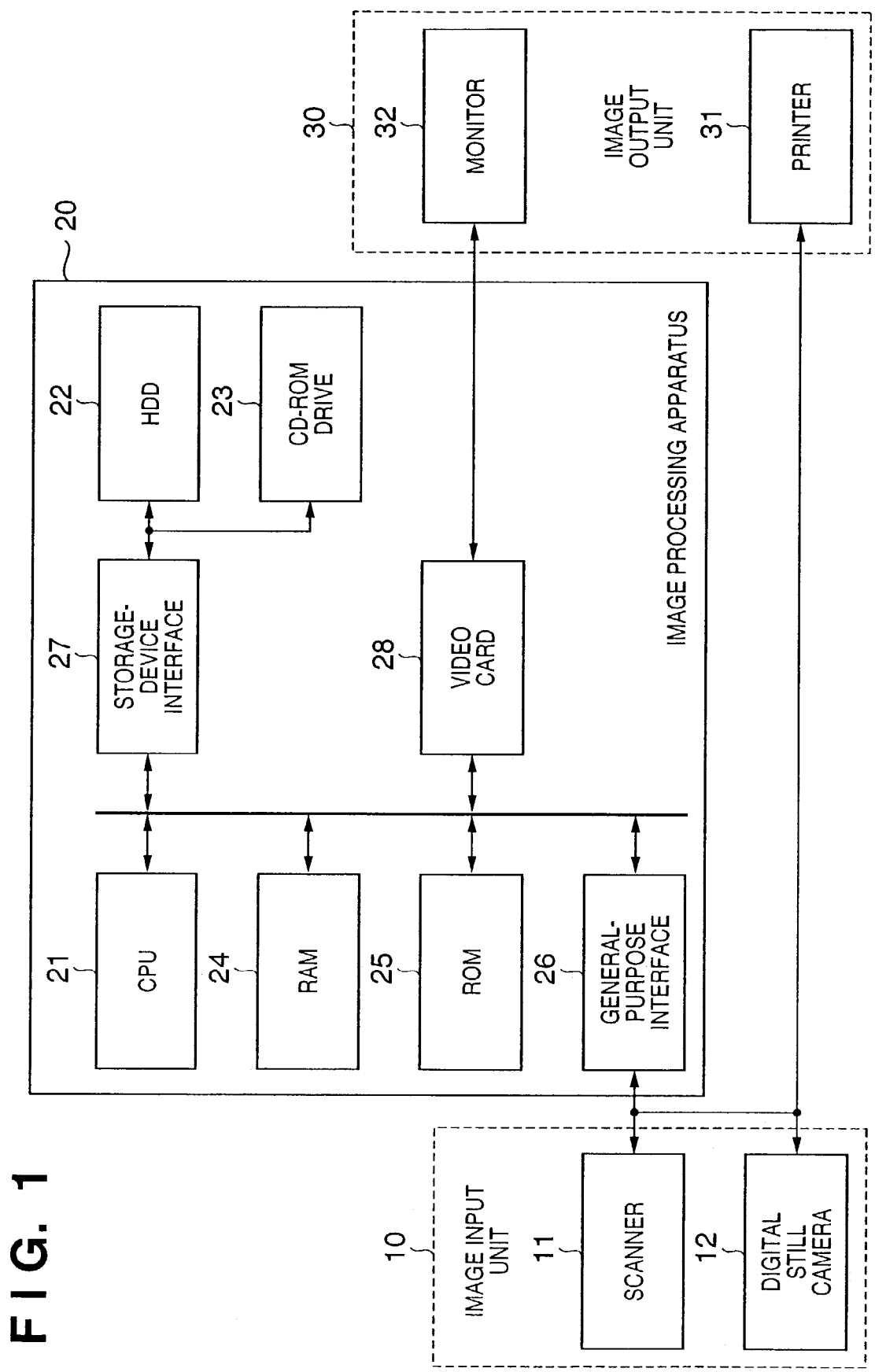
FIG. 1 is a block diagram illustrating the configuration of an image processing system according to a preferred embodiment of the present invention.

FIG. 1 is a block diagram illustrating the configuration of an image processing system according to a preferred embodiment of the present invention.

As shown in FIG. 1, the system includes an image input unit 10 comprising devices such as a film scanner or image scanner 11 and a digital still camera 12 capable of acquiring a color image. The image input unit 10 outputs image data (continuous tone color-specification data) representing the acquired color image.

An image processing apparatus 20 comprising a personal computer or the like applies predetermined image processing to image data that is input via a general-purpose interface 26 such as a USB (Universal Serial Bus) or IEEE1394, and outputs image data representing result of this processing to an image output unit 30. It should be noted that a parallel interface such as an SCSI or GPIB or serial interface such as an RS232C or RS422 can also be utilized as the general-purpose interface 26.

The image output unit 30 comprises devices such as a monitor 32 and printer 31 for outputting a color image. The image output unit 30 displays and prints a color image that is based upon image data that is input via a video card 28 or the general-purpose interface 26.

The image processing apparatus 20 has a CPU 21 that utilizes a RAM 24 as a working memory for running software (inclusive of a BIOS, operating system, various drivers and application software) that has been stored in a ROM 25, on a hard-disk drive (HDD) 22 and on a medium supplied to a CD-ROM drive 23, whereby the above-mentioned components are controlled via a system bus 29 and image processing described later is executed.

In the description that follows, it will be assumed that the scanner 11 and digital still camera 12 output, e.g., RGB continuous tone data, that the monitor 32 displays a color image based upon the RGB continuous tone data, and that the printer 31 prints a color image based upon bilevel data of each of the colors C, M, Y, K, lc, lm. In this case, the specific processing executed by the image processing apparatus 20 transforms the RGB continuous tone data, which enters from the scanner 11 or digital still camera 12, to RGB continuous tone data conforming to the color reproduction characteristic of the monitor 32, and to bilevel data of each of the colors C, M, Y, K, lc, lm conforming to the color reproduction characteristic of the printer 31.

[Image processing]

Figure 2:
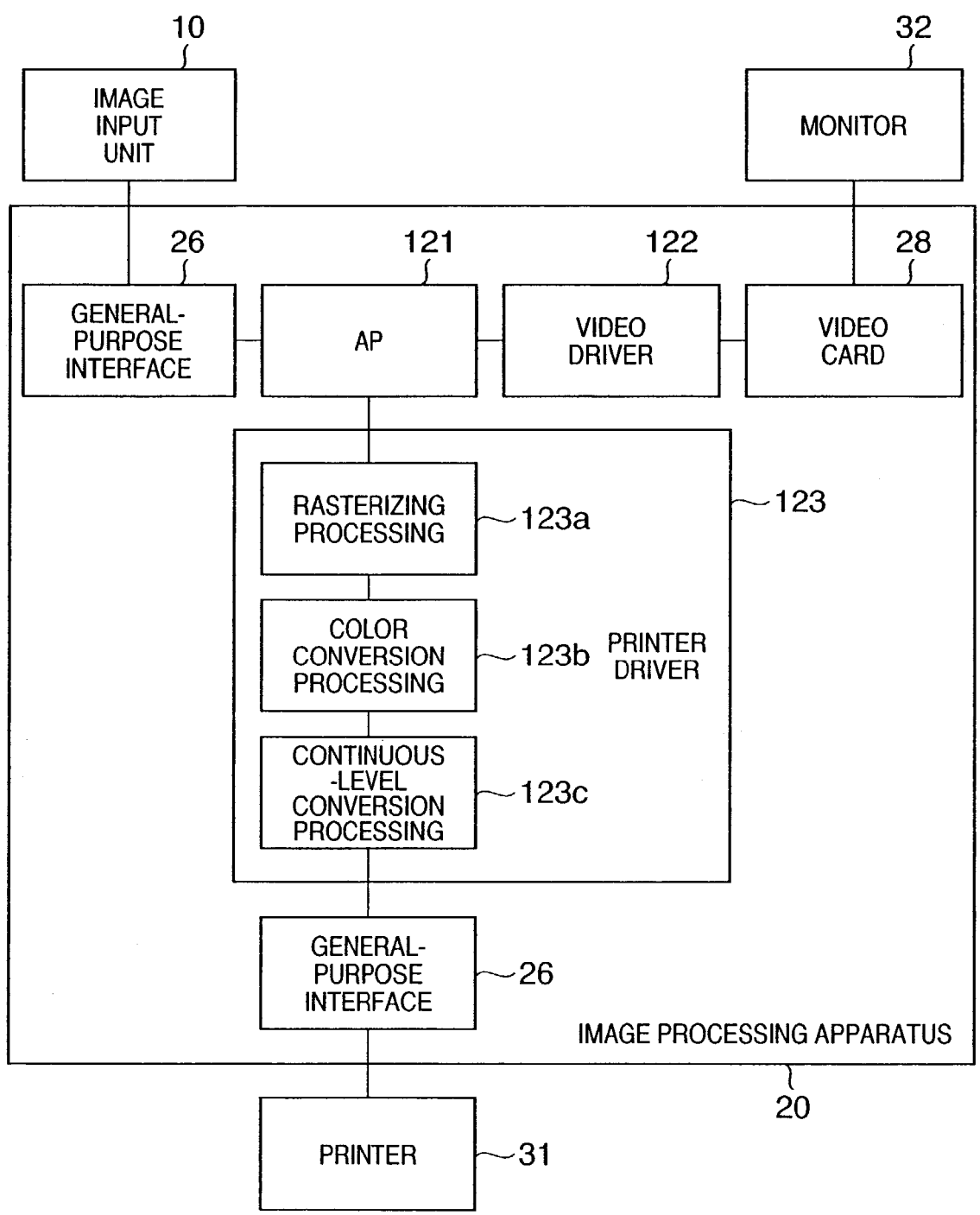
FIG. 2 is a diagram useful in describing image processing executed by an image processing apparatus.

FIG. 2 is a diagram useful in describing the image processing above. Application software (AP) 121 acquires image data from the scanner 11 or digital still camera 12 via the general-purpose interface 26 and delivers this image data to the personal computer 122. Using a color conversion table or conversion function, the personal computer 122 writes image data for display, which has been corrected in accordance with the color reproduction characteristic of the monitor 32, to a video memory on the video card 28. The video card 28 supplies the monitor 32 with image data read out of the video memory at a prescribed timing and in a prescribed order, whereby the color image acquired by the scanner 11 or digital still camera 12 is displayed on the monitor 32.

The AP 121 delivers image data for printing to a printer driver 123 in response to a command from the user. The printer driver 123 uses rasterizing processing 123a to convert the data to image data having a format required by the printer 31. Since the printer 31 is an ink-jet printer in the case of this embodiment, the rasterizing processing 123a is executed, utilizing a band memory allocated to the RAM 24, whenever the printhead of the printer 31 performs a single scan of printing. It goes without saying that if the printer 31 is a page printer, then rasterizing is performed on a page-by-page basis utilizing a page memory allocated to the RAM 24.

The rasterized image data is converted to CMYKlclm continuous tone data, which conforms to the color reproducibility of the printer 31, by color conversion processing 123b using a color conversion table, and further to bilevel data by continuous-level conversion processing 123c. The continuous-level conversion processing 123c is provided as a halftoning module and binarizes (or quantizes to three or four levels, etc.) image data of, e.g., 256 continuous levels by a well-known technique such as the error diffusion method of dithering. The details of these methods are described in the specification of Japanese Patent Publication No. 7-30772, etc.

The binary data of CMYKlclm obtained by the continuous-level conversion is read out of, e.g., the RAM 24 at a prescribed timing and in a prescribed order and is sent to the printer 31 via the general-purpose interface 26. The color image acquired by the scanner 11 or digital still camera 12 is printed on printing paper by the printer 31.

[Color conversion table]

The color conversion processing 123b is provided as a color transformation module having a color conversion table. In order to transform continuous tone color-specification data between different color-specification spaces, the color conversion table is created by establishing correspondence between continuous tone color-specification data of the color-specification space into which the conversion is to be made and the grid points of the color-specification space from the which the conversion is to be made. More specifically, this table is a three-dimensional look-up table (referred to below as a "3D LUT") to which RGB continuous tone data is input as an input value and from which CMYKlclm continuous tone data is output.

If 256 continuous levels are used to express both the RGB and CMYKlclm continuous tone data, then the full-size color conversion table corresponding to the continuous tone from which the conversion is made will possess at least about 16,700,000 (256×256×256) elements, as mentioned earlier. Furthermore, since each element is six bytes for the six colors CMYKlclm (256 continuous levels each), the data size of the full-size color conversion table is about 96 MB.

Accordingly, taking into consideration the balance between memory resources and computation speed, the color conversion table employs, e.g., a 33×33×33 grid in which values along each of the RGB axes are taken sporadically, and an output value between grids is calculated by interpolation from the output values of the surrounding grid points. An ordinary tetrahedral interpolation or the like is utilized for this interpolation calculation.

With regard to the format of a color conversion table that employs a 33×33×33 grid, an array of 33×33×33×6-number of elements is adopted in order to output data of the six colors CMYKlclm with respect to RGB values (R=0, 8, . . . , 255, G=0,8, . . . , 255, B=0,8, . . . , 255) sampled at equal intervals, and the array values are written to memory in order starting from the head of the file. In order to refer to the data of a full-size color conversion table, therefore, first pointers Pr, Pg and Pb corresponding to respective ones of RGB axes are set, then 6-byte data is read out from the following offset address Adr:

$$Adr=Pr\times33\times33\times6+Pg\times33\times6+Pb\times6$$

Each byte of the six bytes read out corresponds to a respective one of the C, M, Y, K, lc and lm data. If the data that has been read out of the color conversion table is written sequentially as a file to, e.g., the hard-disk drive 22 using a similar file structure, then a table file of grid points will be obtained. Of course, the format of the color conversion table described above (point ordered manner format) is only an example. For instance, cyan data may be distributed over all coordinates, and data may be similarly distributed overall coordinates in the order of magenta, yellow, . . . and light magenta. Furthermore, data may be retained in memory in the form of compressed data.

[Downsampling processing]

Figure 3:
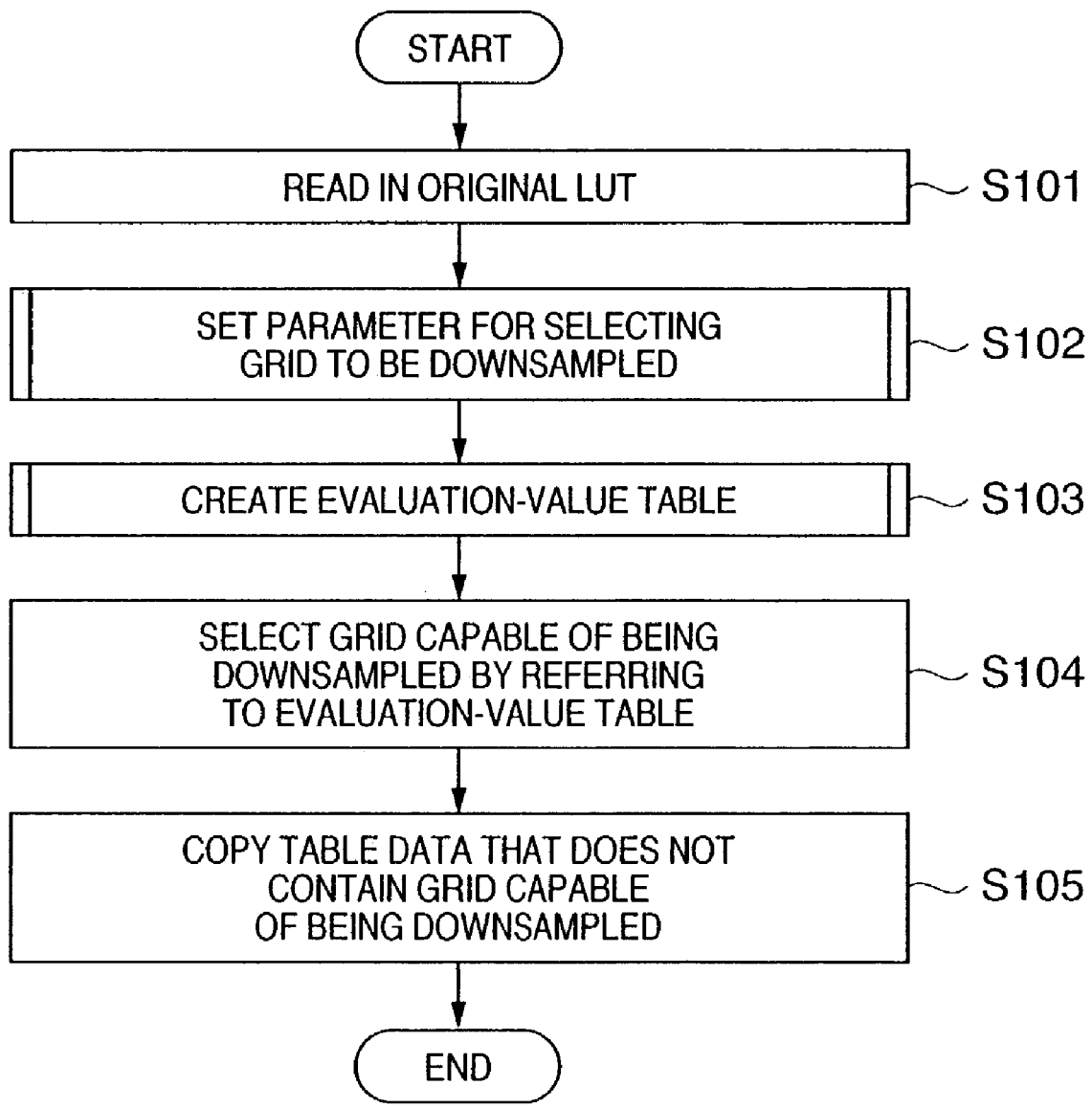
FIG. 3 is a flowchart useful in describing processing for downsampling a color conversion table.

FIG. 3 is a flowchart useful in describing processing for downsampling a color conversion table. This processing is executed by the CPU 21. The color conversion table to undergo downsampling processing will be described below as being one having 33 grids for the six colors CMYKlclm. However, there is no limit upon the number of grids or number of colors. Further, in order to simplify the description, the number of grids for RGB will also be taken as being 33 and grid interval thereof will be set to eight. However, the downsampling processing described below can be extended and applied also to a color conversion table in which the number of grids and interval have been set for each of RGB, by way of example.

First, the color conversion table (referred to as an "original LUT" below, an example of which is illustrated in FIG. 4) to undergo downsampling is supplied by a CD-ROM or the like and is read in (S101). Next, a parameter for selecting a grid to be downsampled when the original LUT is downsampled is set (S102).

Figure 5:
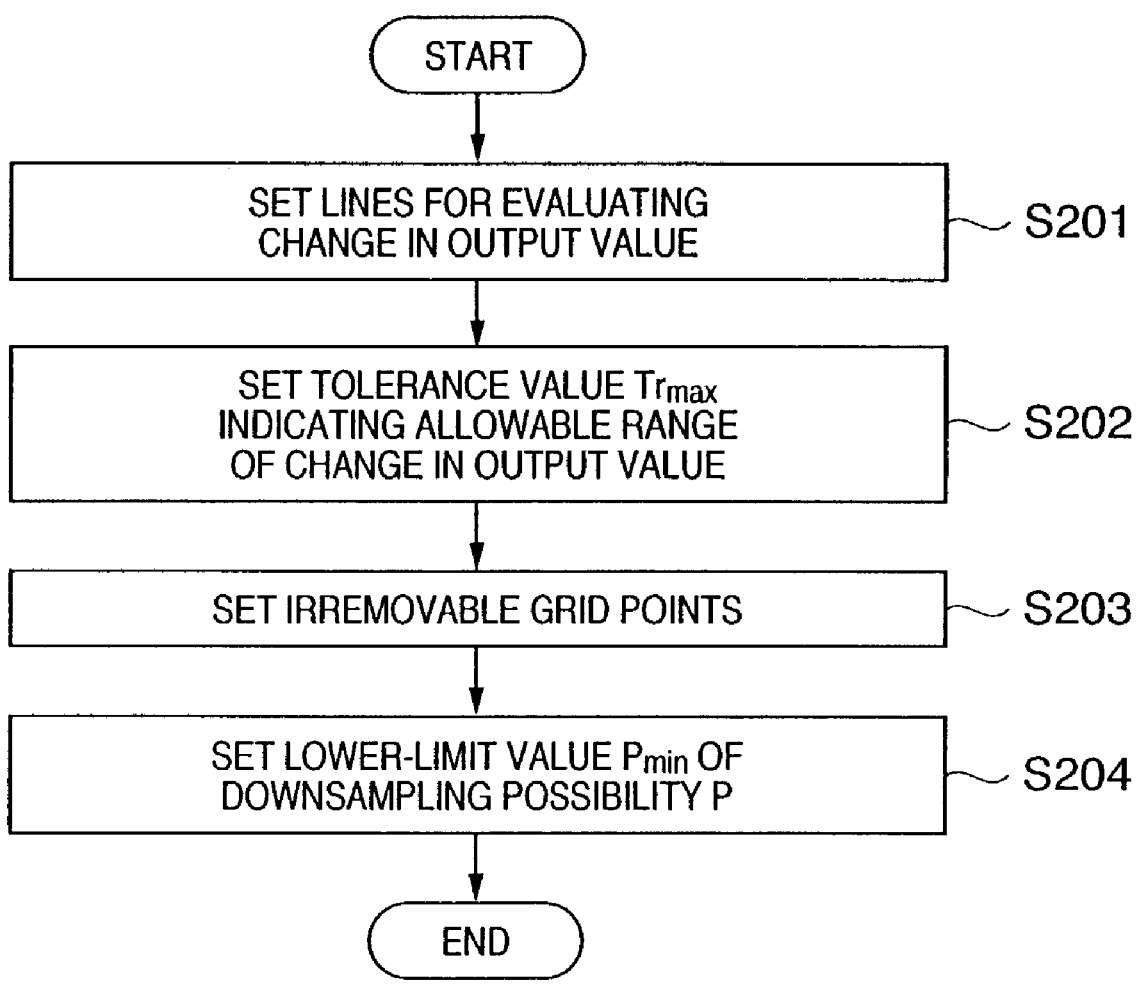
FIG. 5 is a flowchart useful in describing processing for setting a parameter that is for selecting a grid to undergoing downsampling.

FIG. 5 is a flowchart useful in describing processing for setting a parameter that is for selecting a grid to undergoing downsampling.

If grids are simply downsampled from the original LUT, the point of changeover from CMY to K on the gray line may shift slightly and tonality may deteriorate, as mentioned above. Accordingly, a change in the output value of the original LUT is investigated with regard to a specific portion of the color solid and the grid downsampled is decided in accordance with this change. In the color solid shown in FIG. 6, therefore, lines for evaluating the change in output value are set (S201).

Figure 6:
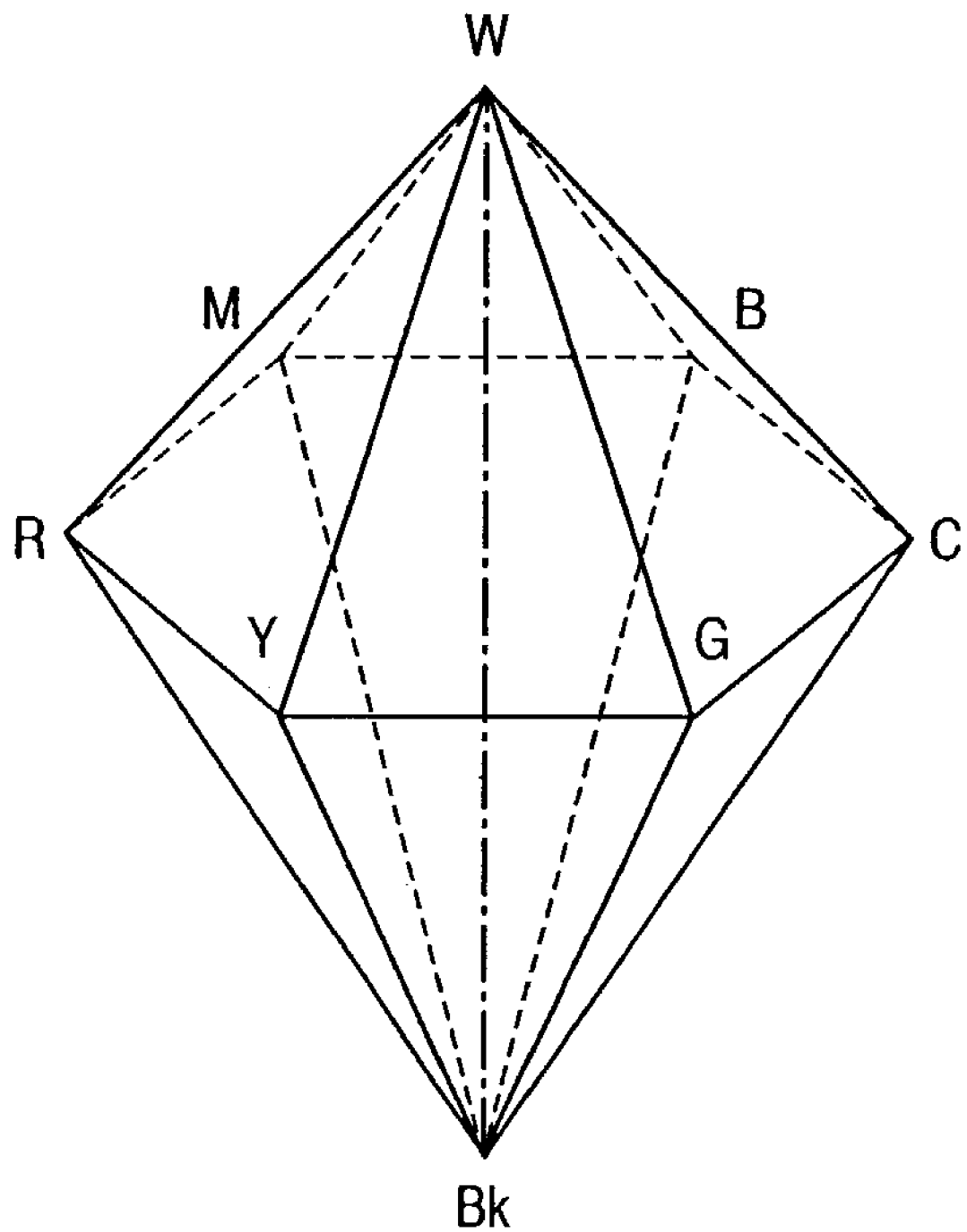
FIG. 6 is a diagram showing a color solid.

In this embodiment, lines (all 18 ridge lines and gray lines) indicated by solid lines, broken lines and one-dot chain lines in the color solid of FIG. 6 are to undergo evaluation from among all grid points contained in the original LUT. For example, if it is desired to execute downsampling processing that takes into account the tonality of a skin-color area, then lines passing through this skin-color area would be added to the lines to undergo evaluation.

Next, owing to downsampling processing, there will be instances where output values at the remaining grid points take on values different from those of the original LUT. Accordingly, next there is set a tolerance value $Tr_{max}$ that indicates the allowable range of change in the output value at a grid point before and after downsampling (S202).

Next, grid points that must not undergo downsampling (these shall be referred to as "irremovable grid points" below) by downsampling processing are set explicitly (S203). In this embodiment, the following points are adopted as irremovable grid points:

(1) Primary colors, white point and black point

In FIG. 6, the primary colors correspond to R, Y, G, C, B and M, the white point corresponds to W and the black point corresponds to Bk.

(2) Ink starting and end points

Figure 14:
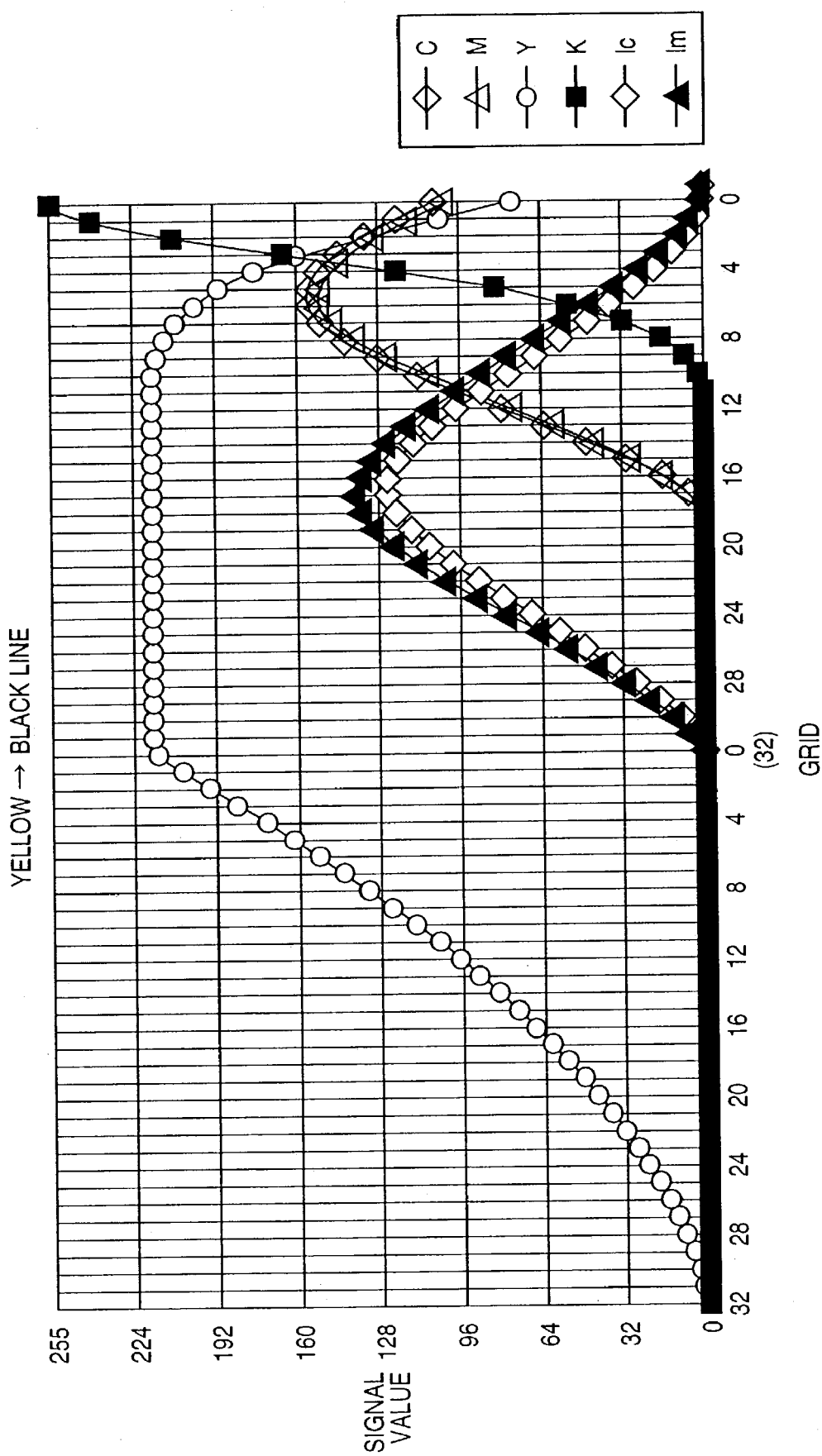
FIG. 14 is a diagram showing an example of a yellow→black line.

Ink starting and end points are such that grid number 32 is the ink starting point and grid number 0 the ink end point, which are shown in FIG. 14 by way of example, focusing on lm of the yellow→black line.

Let 0 represent the grid number of R=G=B=0 on the gray line, let 32 represent the grid number of R=G=B=255, and let $LUT_{GL}M[\ ]$ represent an array in which output values of M at each of the grid points on the gray line have been stored in order of increasing grid number. The ink starting point Ps and end point Pe can then be expressed as follows:

$Ps: LUT_{GL}M[Ps-1]=0\&\&LUT_{GL}M[Ps]>0$ $Pe: LUT_{GL}M[Pe]>0\&\&LUT_{GL}M[Pe+1]=0$ where && represents a logical AND operator.

Further, irremovable grid points may be given as a table instead of setting these conditions.

Next, when a grid to be downsampled is selected, an evaluation value referred to as "downsampling possibility P" is set with regard to all grids, and a grid to be downsampled is selected by comparing the evaluation values of each of the grids. However, it is desired that a grid having a fairly low downsampling possibility P not be downsampled. Accordingly, a lower-limit value Pmin of downsampling possibility P is set when selecting a grid to be downsampled (S204).

Next, as shown in FIG. 3, a correspondence table evaluation-value table) of correspondence between grids to be evaluated and downsampling possibility P of the grids is created based upon the parameter set at step S102 (S103).

Figure 7:
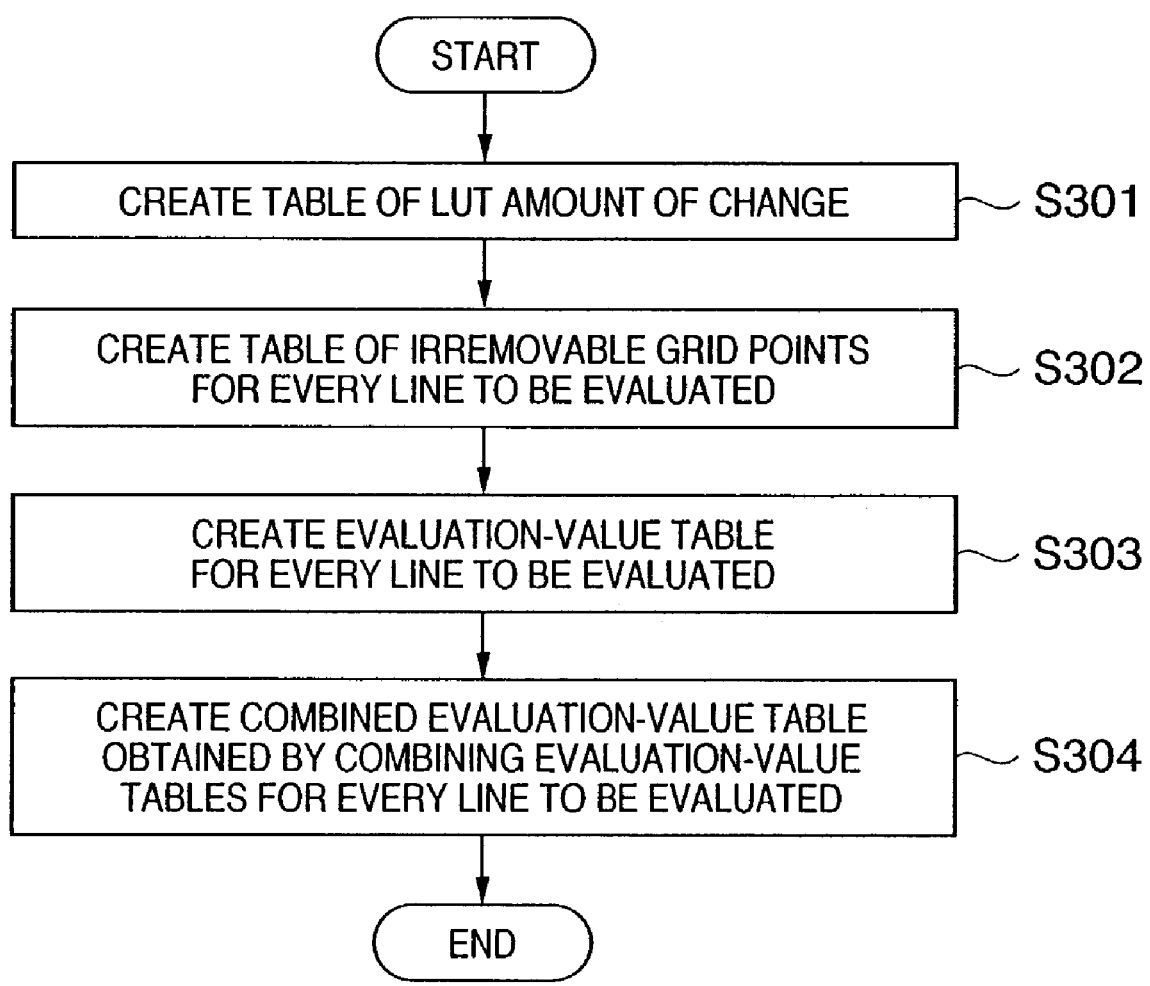
FIG. 7 is a flowchart useful in describing processing for creating an evaluation-value table.

FIG. 7 is a flowchart useful in describing processing for creating an evaluation-value table. It should be noted that processing for creating an evaluation-value table involves creating an evaluation-value table for every line to undergo evaluation set at a step S201 and combining the evaluation-value tables of every line to thereby create an evaluation-value table of all lines to undergo evaluation.

First, the LUT finally obtained is used in a color conversion that employs linear interpolation such as tetrahedral interpolation. In a case where the output value of a certain grid point is obtained by linear interpolation from the output values of surrounding grid points, therefore, it does not matter if this grid point is eliminated. Furthermore, in a case where the difference between the output value at a certain grid point and a value obtained by linear interpolation from the output values of grid points surrounding this grid point is small, the influence on image quality will be small even if this grid point is eliminated. Accordingly, in order to determine whether the value at a grid point of interest will be obtained by linear interpolation from output values at grid points surrounding this grid point, an amount of change in the LUT is defined and this is used to make the determination. In other words, a table illustrating amount of change in a LUT defined by an equation set forth below is created (S301).

By way of example, with regard to M of a gray line, a LUT change-amount $\text{diff}_{GL}M(j)$ at a jth grid point is given by the equation below. The actual table is classified according to line to undergo evaluation and by ink color.

$\text{diff}_{GL}M(j)=|(LUT_{GL}M[j-1]+LUT_{GL}M[j+1])/2-LUT_{GL}M[j]|$

FIG. 8 is a diagram illustrating an example of a table illustrating amount of change in a LUT.

Next, based upon the conditions for selecting irremovable grid points set at step S203, a table of irremovable grid points is created for every line to undergo evaluation (S302). It should be noted that the table of irremovable points is a table in which an irremovable grid point is indicated by "0" and other grid points by "1". For example, the value of an irremovable grid point table at a jth grid point is as follows:

$LUT\_INV_{GL}M[j]=0 \text{ or } 1$

It should be noted that since the grid of a LUT is classified according to ink color, the result of taking the logical AND of six colors is set as a table of irremovable grid points, as indicated by the following equation:

$LUT\_INV_{GL}[j] =$
$LUT\_INV_{GL}C[j] \&\& LUT\_INV_{GL}M[j] \&\& LUT\_INV_{GL}Y[j] \&\&$
$LUT\_INV_{GL}K[j] \&\& LUT\_INV_{GL}lc[j] \&\& LUT\_INV_{GL}lm[j]$

FIG. 9 is a diagram showing an example of a table of irremovable grid points. The table is classified according to line to undergo evaluation.

Figure 10:
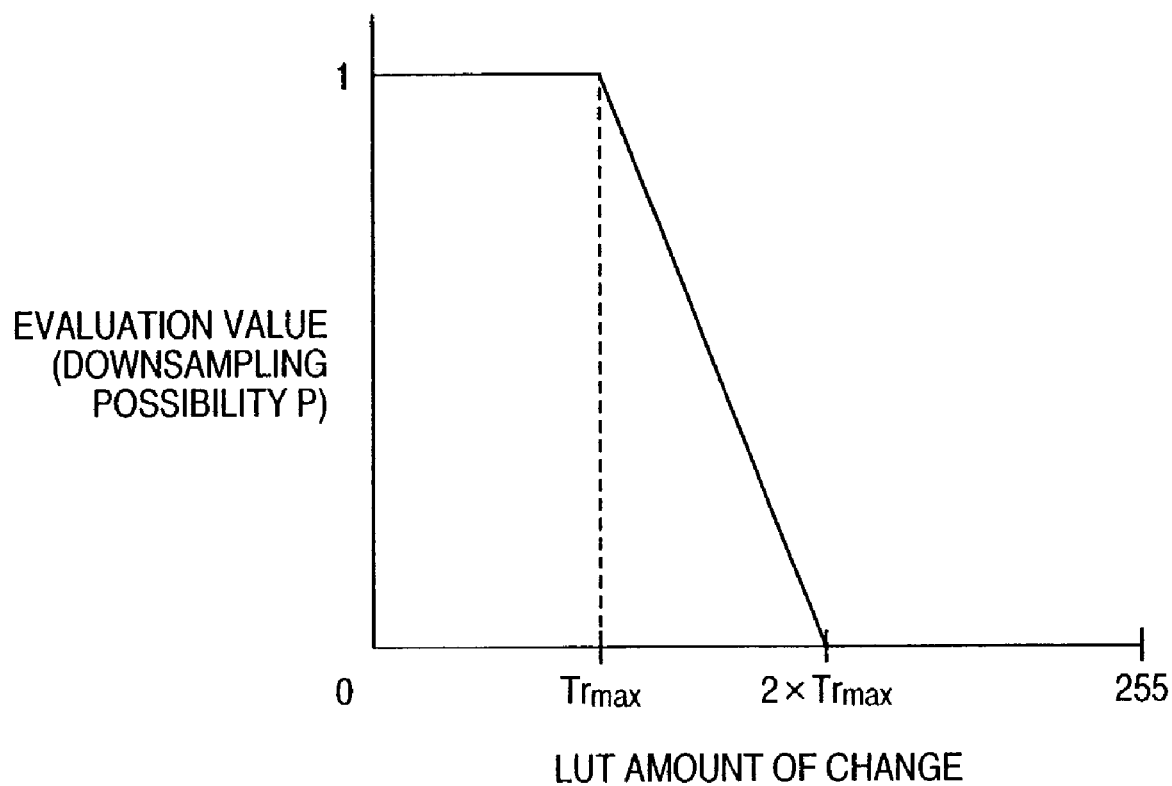
FIG. 10 is a diagram illustrating an example of an evaluation function.

Next, though the LUT amount of change (absolute value) takes on a value greater than zero, the LUT amount of change is converted to the downsampling possibility P using an evaluation function $f(\cdot)$, which is shown in FIG. 10, taking the tolerance value $Tr_{max}$ into consideration. The downsampling possibility P in FIG. 10 is 1 below the tolerance value $Tr_{max}$, 1 to 0 from $Tr_{max}$ to $2 \times Tr_{max}$, and 0 above $2 \times Tr_{max}$. It should be noted that downsampling possibility P=0 represents no possibility of downsampling.

For example, with regard to M of the gray line, the evaluation value, which is classified according to line to be evaluated and according to ink color, of the jth grid is given by the following equation:

$\text{eva}_{GL}M[j]=f(\text{diff}_{GL}M[j])=0.3$

It should be noted that since the grid of the LUT is classified according to ink color, the result of taking the average of the six colors is adopted as the downsampling possibility P classified according to the line to undergo evaluation, as indicated by the following equation:

$P_{GL}[j] = (eva_{GL}C[j] + eva_{GL}M[j] + eva_{GL}Y[j] +$
$eva_{GL}K[j] + eva_{GL}lc[j] + eva_{GL}lm[j])/6$ Furthermore, an evaluation table is created using the product (the following equation) with the value of the table of irremovable grid points as the value of the evaluation-value table classified according to the line to undergo evaluation.

$P[j]=P[j]\times LUT\_INV_{GL}[j]$

The grid of a LUT cannot be changed over every line to undergo evaluation. Accordingly, a combined evaluation-value table capable of supporting the entirety of a color solid is created using the evaluation-value table of every line to undergo evaluation (S304).

$$LUT\_P[j] = LUT\_P_{GL}[j] \times LUT\_P_{W2C}[j] \times$$
$$LUT\_P_{W2M}[j] \times \cdots \times LUT\_P_{G2K}[j] \times LUT\_P_{B2K}[j]$$

Here the subscript of each LUT corresponds to the following line to be evaluated:

$$GL: \quad W(255, 255, 255) \quad \rightarrow \quad Bk(0, 0, 0)$$
$$W2C: \quad W(255, 255, 255) \quad \rightarrow \quad C(0, 255, 255)$$
$$W2M: \quad W(255, 255, 255) \quad \rightarrow \quad M(255, 0, 255)$$
$$\vdots \qquad\qquad\qquad \vdots$$
$$G2K: \quad G(0, 255, 0) \quad \rightarrow \quad Bk(0, 0, 0)$$
$$B2K: \quad B(0, 0, 255) \quad \rightarrow \quad Bk(0, 0, 0)$$

Figure 12:
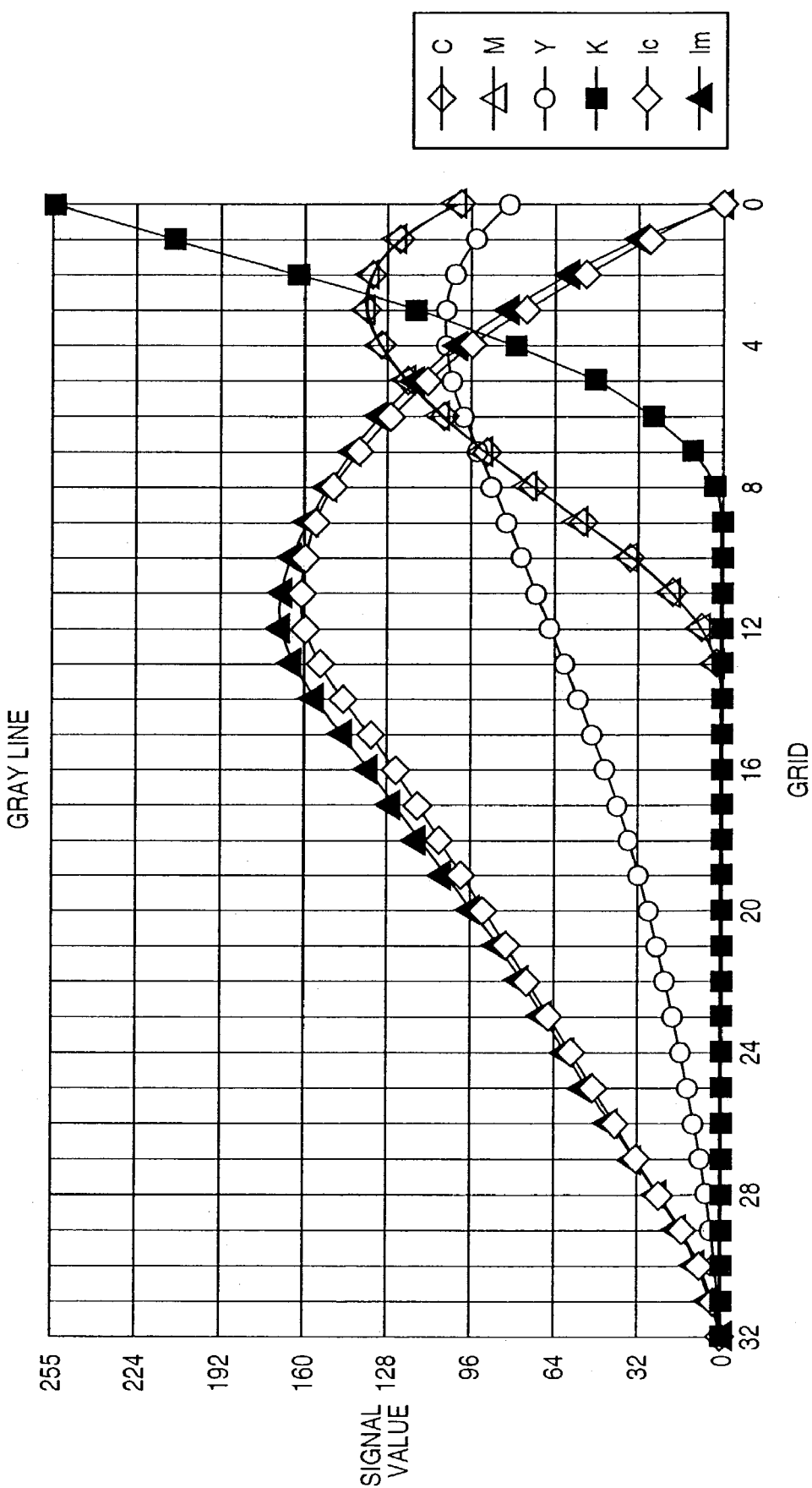
FIG. 12 is a diagram showing an example of a color conversion table having 33 grids.
Figure 13:
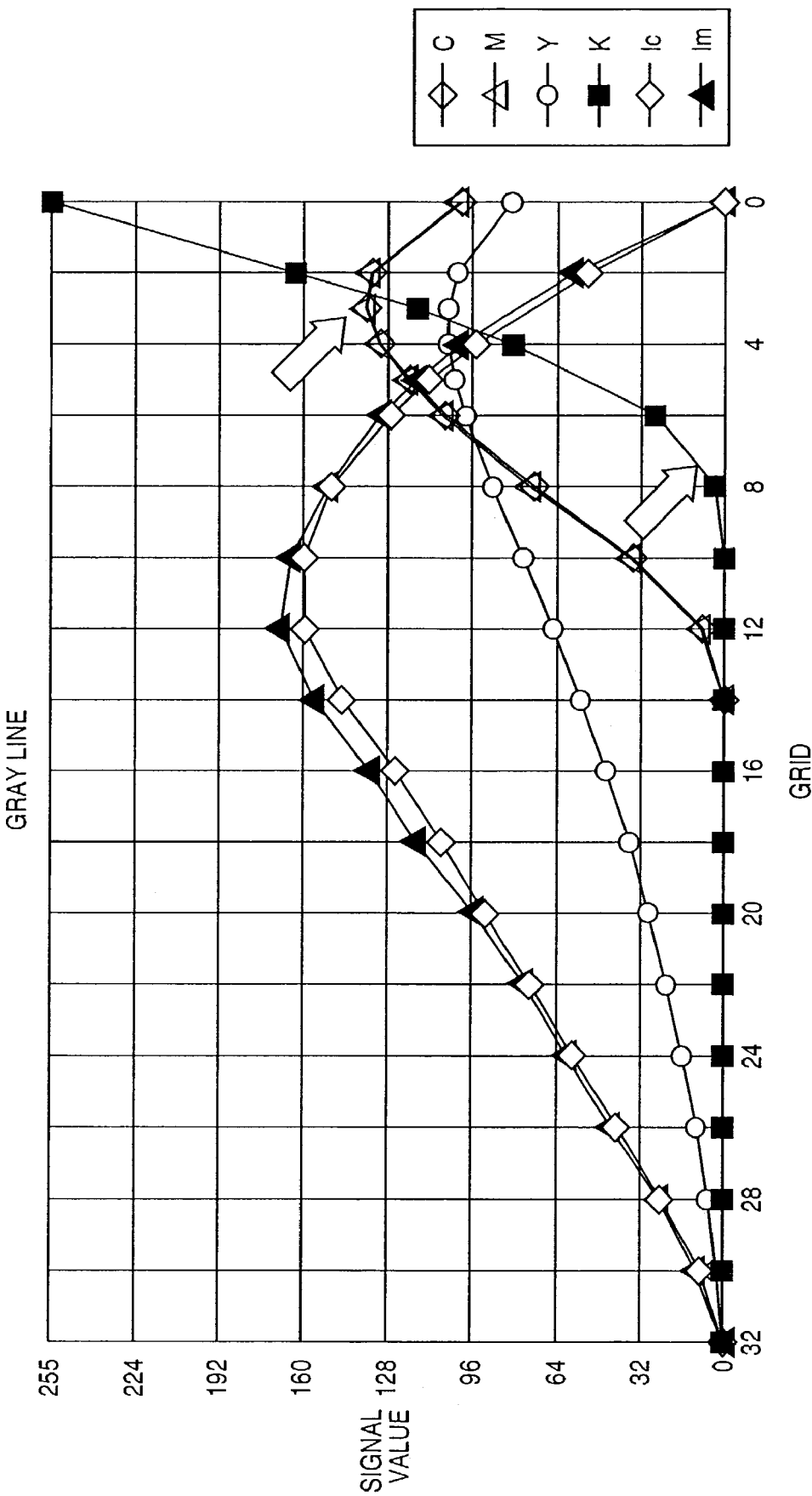
FIG. 13 is a diagram showing an example of a color conversion table having 17 grids obtained by simple downsampling.
Figure 15:
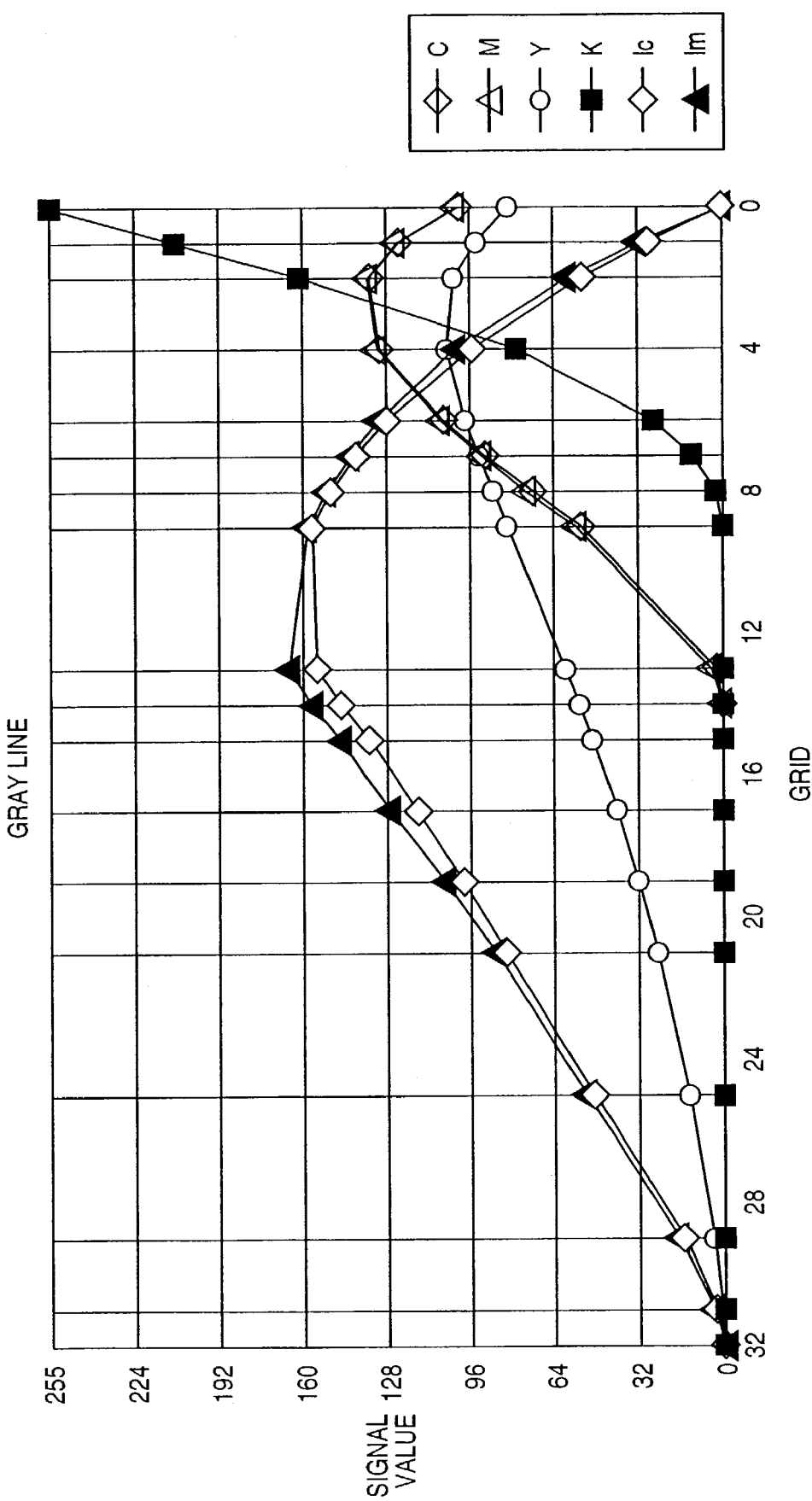
FIG. 15 is a diagram illustrating the gray line of a color conversion table after downsampling processing.

Next, as shown in FIG. 3, each value of the evaluation-value table (the evaluation value of a grid to undergo evaluation) obtained at step S103 and the lower-limit value $P_{min}$ of downsampling possibility P set at step S102 are compared, a grid capable of being downsampled at evaluation value>$P_{min}$ is selected (S104) and table data that does not contain this grid is copied to a prescribed area of, e.g., the hard-disk drive 22 (S105), whereby a color conversion table that has undergone grid downsampling is obtained. If the downsampling processing of steps S104 and S105 is described in the C++ language format, the result is as follows:

```
/*downsampling processing */
long ICount = 0;
for (int nR = 0; nR >= 32; nR++){
    for (int nG = 0; nG >= 32; nG++){
        for (int nB = 0; nB >= 32; nB++){
            long IIndex = (nR*33+nG)*33+nB;
            If (LUT_P[nR] >Pmin&&LUT_P[nG] > Pmin&&LUT_P [nB] >Pmin) {
                bArrayResult [ICount++] = bArrayOrigin [IIndex];
            }else{
            /*downsample */
            */ not copied to /*bArraOrigin[ ]
            }
        }
    }
}
``` where nR, nG and nG: local variables for referring to a grid;

IIndex: address counter for referring to the color conversion table;

bArrayResult[ ]: color conversion table after interpolation processing; and bArrayOrigin[ ]: color conversion table before conversion FIG. 11 is a diagram illustrating an example of a color conversion table after downsampling processing. This is a 19×19×19 grid table obtained by downsampling the original color conversion table (a 33×33×33 grid) of FIG. 4 by 14 grids. Further, FIG. 15 is a diagram illustrating the gray line of a color conversion table after downsampling processing. A result in which the way of use of the ink at the changeover point of the continuous tone ink indicated by the arrows in FIG. 13 is approximated in the original color conversion table (FIG. 12) is obtained.

Thus, it is possible to create a color conversion table in which grids capable of being downsampled have been downsampled from an original color conversion table of any number of grids, this being achieved with little influence upon image quality. Accordingly, a color conversion table of any accuracy can be obtained in conformity with the environment in which the color conversion table is utilized, e.g., a photo-direct printer, etc., problems caused by color conversion processing in hardware having a comparatively small storage capacity can be prevented, and it is possible to provide a color conversion table for implementing a color conversion at high speed and with little decline in image quality.

In the foregoing, an example in which a 3D-LUT downsampling method is used in a 6-color color conversion table for RGB→CMYKlclm is described. However, it should be obvious that by using a similar method in a 4-color or 3-color color conversion table for RGB→CMYK or RGB→CMY, or in a 3-color color correction table for RGB→R'G'B', an original highly accurate 3D LUT having a large number of grids can be downsampled and it is possible to obtain a 3D LUT of a small number of grids through which a highly accurate color conversion (color correction) can be performed.

Second Embodiment

An image processing apparatus according to a second embodiment of the invention will now be described. Components in this embodiment similar to those of the first embodiment are designated by like reference characters and need not be described again in detail.

In the second embodiment, a color conversion table having a specific number of grids is obtained as an output.

Figure 16:
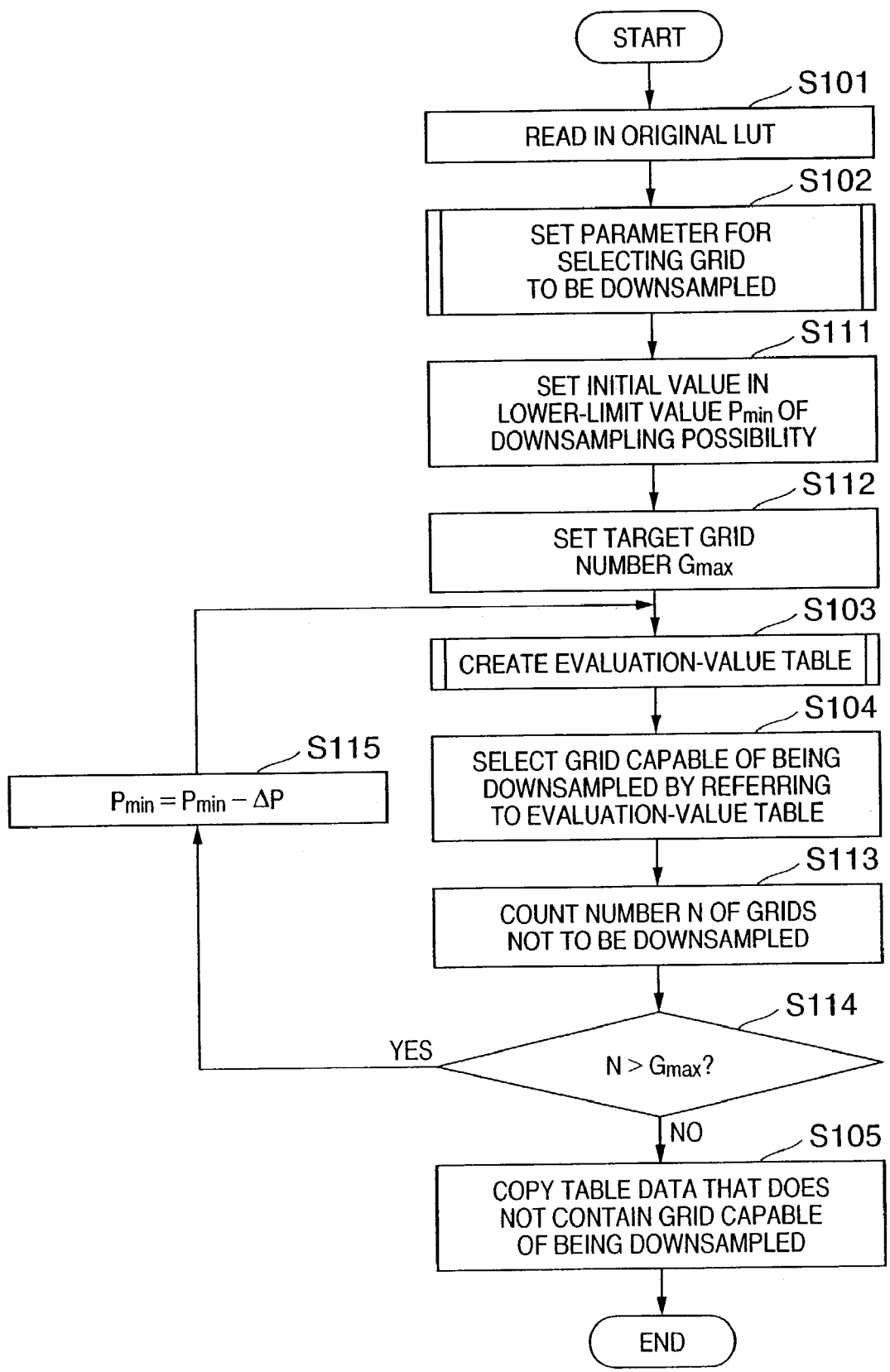
FIG. 16 is a flowchart useful in describing processing for downsampling a color conversion table according to a second embodiment of the present invention.

FIG. 16 is a flowchart useful in describing processing for downsampling a color conversion table according to a second embodiment of the present invention. Steps identical with those in FIG. 3 are designated by like step numbers and need not be described again in detail.

Following the writing of the original LUT (S101) and the setting of the selection parameter (S102) for grids to be downsampled (exclusive of the lower-limit value Pmin), "1" is set as the initial value of the lower-limit value Pin of downsampling possibility P (S111) and a target number Gmax of grids is set (S112).

Following the creation of the evaluation-value table (S103). and selection of grids that can be downsampled (S104), the number of grids that will not be downsampled is counted (S113) and it is determined whether the count has attained the target number Gmax of grids (S114). If the target number Gmax has not been attained, the lower-limit value Pmin of the downsampling possibility P is reduced by a predetermined value AP (S115) and steps S304, S305 are repeated until the target number Gmax is attained.

Thus, according to the second embodiment, a color conversion table having a predetermined number of grids can be obtained. This is effective in a case where the utilizable amount of memory is limited. It should be noted that there are cases where the target number Gmax of grids cannot be attained for the set line to be evaluated and under the condition of the tolerance value $Tr_{max}$. Accordingly, though the operation is not shown, it is determined at step S114 whether lower-limit value $P_{min}>0$ holds. If $Pmin \leqq 0$ is found to hold, then a warning is issued, a color conversion table having a number of grids that does not satisfy the target number Gmax is output and processing is terminated.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A method of generating a color conversion table for transforming continuous tone color-specification data, comprising the steps of:
   inputting a color conversion table to serve as a source of conversion to a color conversion table after conversion;
   setting a limitation when thinning a grid of the color conversion table to serve as the source of conversion;
   calculating an evaluation value in consideration of a permissible range for a change in an output value between the color conversion tables before and after the thinning;
   deciding the grid which can be thinned by determining the evaluation value based on the limitation; and
   generating the color conversion table after conversion by thinning the grid which can be thinned.

2. The method according to claim 1, wherein said calculation step includes calculating the evaluation value in a gray line of the color conversion table to serve as the source of conversion.

3. The method according to claim 1, wherein said calculation step includes calculating the evaluation value in a line passed through a skin-color area of the color conversion table to serve as the source of conversion.

4. The method according to claim 1, wherein the evaluation value is according to a change in an output value between grids of the color conversion table to serve as the source of conversion.

5. The method according to claim 1, further comprising the step of setting a grid point which can be not thinned in the thinning.

6. The method according to claim 1, further comprising the step of setting a target of the number of grids,
   wherein the limitation is repeatedly set until the target is satisfied.

7. An apparatus for generating a color conversion table for transforming continuous tone color-specification data, comprising:
   an input section arranged to input a color conversion table to serve as a source of conversion to a color conversion table after conversion;
   a setting section, arranged to set a limitation when thinning a grid of the color conversion table to serve as the source of conversion;
   a calculator, arranged to calculate an evaluation value in consideration of a permissible range of a change in an output value between the color conversion tables before and after the thinning;
   a decider, arranged to decide the grid which can be thinned by determining the evaluation value based on the limitation; and
   a generator, arranged to generate the color conversion table after conversion by thinning the grid which can be thinned.

8. A computer-readable medium storing a computer program for causing a computer to perform a method of generating a color conversion table for transforming continuous tone color-specification data, comprising the steps of:
   inputting a color conversion table to serve as a source of conversion to a color conversion table after conversion;
   setting a limitation when thinning a grid of the color conversion table to serve as the source of conversion;
   calculating an evaluation value in consideration of a permissible range of a change in an output value between the color conversion tables before and after the thinning;
   deciding the grid which can be thinned by determining the evaluation value based on the limitation; and
   generating the color conversion table after conversion by thinning the grid which can be thinned.

* * * * *

UNITED STATES PATENT AND TRADEMARK OFFICE
CERTIFICATE OF CORRECTION

| | |
|---|---|
| PATENT NO. | : 7,355,751 B2 |
| APPLICATION NO. | : 10/464529 |
| DATED | : April 8, 2008 |
| INVENTOR(S) | : Okinori Tsuchiya |

It is certified that error appears in the above-identified patent and that said Letters Patent is hereby corrected as shown below:

<u>COLUMN 8</u>:

Line 5-6, "$diff_{GL}M(j)=|L(LUT_{GL}M[j-1]+LUT_{GL}M[j+1])/2-LUT_{GL}M[j]|$" should read --$diff_{GL}M(j)=|(LUT_{GL}M[j-1]+LUT_{GL}\text{-}M[j+1])/2-LUT_{GL}M[j]|$--.

<u>COLUMN 12</u>:

Line 24-25, "can be not thinned in the thinning" should read --cannot be thinned in the thinning--.

Signed and Sealed this

Sixteenth Day of September, 2008

JON W. DUDAS
*Director of the United States Patent and Trademark Office*